United States Patent [19]

Williams

[11] Patent Number: 4,936,415
[45] Date of Patent: Jun. 26, 1990

[54] BOW HOLDER FOR A TREE STAND

[76] Inventor: Ralph D. Williams, 210 Whispering Pines, Haughton, La. 71037

[21] Appl. No.: 418,623

[22] Filed: Oct. 10, 1989

[51] Int. Cl.⁵ .................. E04G 5/06; F16M 11/00; F41B 5/00; A45F 3/26
[52] U.S. Cl. .................................. 182/187; 124/23.1; 248/176; 211/13
[58] Field of Search .............. 182/187, 188, 129; 248/176; 124/23 R; 211/13

[56] References Cited

U.S. PATENT DOCUMENTS

| | | |
|---|---|---|
| Des. 260,674 | 9/1981 | Simmons et al. |
| Des. 281,344 | 11/1985 | Duke |
| Des. 299,199 | 1/1989 | Rogowski |
| 1,837,637 | 12/1931 | Walberg .......................... 248/187 |
| 3,256,872 | 6/1966 | Koser |
| 3,441,241 | 4/1969 | Brooks |
| 3,578,282 | 5/1971 | Olsen |
| 3,780,971 | 12/1973 | De Filipps |
| 3,991,780 | 11/1976 | Maroski, Jr. |
| 4,230,296 | 10/1980 | Staley ............................. 182/187 |
| 4,331,216 | 5/1982 | Amacker ......................... 182/187 |
| 4,331,311 | 5/1982 | Russell |
| 4,360,179 | 11/1982 | Roberts |
| 4,377,270 | 3/1983 | Kolongowski |
| 4,474,296 | 10/1984 | Hartman |
| 4,542,873 | 9/1985 | Matherly et al. |
| 4,582,165 | 4/1986 | Latini .............................. 182/187 |
| 4,628,893 | 12/1986 | Shaw, III |
| 4,708,221 | 11/1987 | Kubiak ............................ 182/187 |
| 4,729,363 | 3/1988 | Skyba |

*Primary Examiner*—Reinaldo P. Machado
*Attorney, Agent, or Firm*—Nixon & Vanderhye

[57] ABSTRACT

A bow holder having a frame with a channel at one end for fitting about the rung of a tree stand platform, the frame being supported on the upper surface of the platform. The bow holder carries an upstanding bifurcated support at one end for receiving the cable, pulley and bowstring of a bow. An upstanding support arm is pivoted at its opposite end and mounts a cradle at the arm's distal end for receiving the limb of the bow. By adjusting the angular position of the support arm, the angle of the bow in the bow holder can be adjusted as desired.

22 Claims, 3 Drawing Sheets

BOW HOLDER FOR A TREE STAND

BACKGROUND AND SUMMARY OF THE INVENTION

The present invention relates to a holder for supporting a hunter's bow in an upstanding, readily accessible position. Particularly, the present invention relates to a bow holder for mounting on a tree stand whereby the bow may be supported from the platform of the stand and also to such bow holder in combination with the stand.

It has become common practice for many hunters to use a tree stand, for example, for hunting deer, boar, bear and the like. A typical example of a tree stand for this purpose is described and illustrated in U.S. Pat. No. 4,802,552, of common assignee herewith, and reference is made to that patent for a representative construction and use of a tree stand. Typically, the tree stand is hung from a tree at the hunting site well above ground level and the hunter will stand on the platform of the stand during the hunt. Many such tree stands have a seat associated therewith so that the hunter may be seated during the hunt. It is also common practice for hunting many different types of animals, for example, deer, boar, bear, etc., for the hunter to use a bow and arrow. When using a bow and arrow from a tree stand, however, the hunter is confronted with the dilemma of what to do with the bow while the hunter remains virtually motionless on the tree stand platform. For example, the hunter can hold the bow but then his or her hands and fingers may become numb and cold. The hunter can hang the bow, but there must be something nearby from which the bow may be hung. Alternatively, the hunter may lay the bow across his lap while seated on the platform. However, in these cases, the bow is out of position for immediate use. It will also be appreciated that a hunter's substantial and/or rapid movement to bring the bow into firing position enhances the chance the animals will detect that movement and be scared away from the hunting site.

According to the present invention, there is provided a bow holder, for use with a tree stand, for supporting the bow on the stand in an accessible, ready position while simultaneously enabling the tree stand hunter to maintain his hands free. Thus, when using the bow holder hereof, the tree stand bow hunter may dispose his bow in the holder and remain seated or standing on the platform virtually motionless with his or her hands free. Consequently, the hunter's hands may remain limber and warm during the hunt, which may extend over many hours, and this facilitates use of the bow. When the animal is sighted and within firing range, only minimum motion by the hunter is necessary for him or her to lift the bow from the holder and bring it into a firing position. Additionally, and in accordance with the present invention, the bow holder can be mounted on the platform at virtually any position thereabout to accommodate the particular needs or desires of the hunter or a particular hunting situation. Other features of the bow holder will become apparent from the ensuing description. For example, the bow holder is manufactured to accommodate virtually any type of bow, compound or recurved It is formed of a hard, durable plastic material which facilitates virtually noiseless removal of the bow from the holder. Also, the angle of the bow supported by the bow holder may be adjusted to accommodate the needs of the hunter and locate the bow in the most desirable position for the particular hunter whereby movement of the hunter and the bow in removing it from the holder and bringing it into the firing position can be minimized.

In accordance with the present invention, there is provided a bow holder comprising a frame having a flat or linearly extending undersurface for resting on top of a tree stand platform. At one end of the frame, there is provided a depending channel such that, when the undersurface of the frame engages the upper surface of the platform, the channel may engage one of the rungs of the platform. In this manner, the bow holder is releasably supported directly by the tree stand platform. At that one end, the frame has an upwardly extending bifurcated support which also curves upwardly and forwardly toward the opposite end of the frame. The bifurcated support defines a slot or groove for receiving parts of the bow, for example, the bowstring, pulley and cable.

Adjacent the opposite end of the frame, there is provided a bow support arm pivotally connected at its lower end to the frame. The support arm extends upwardly from the frame and is pivoted through a predetermined angular range of movement. The distal end of the support arm carries a cradle for supporting the limb of the bow. By adjustably positioning the support arm in a predetermined angular position, the bow may be set at different angles in the bow holder to accommodate the individual hunter's needs. More particularly, the lower end of the support arm includes a hub mounted on a screw extending between a pair of upstanding bosses carried on opposite sides of the frame. A knob to one side of the frame facilitates rotation of the screw for clamping the hub of the support arm in the selected angular position. In a further embodiment of the present invention, the support arm may be detented into selected angular positions and secured in the selected positions. The hub also carries a stop to prevent over-rotation of the support arm in a forward direction. The groove in the support maintains the bowstring, pulley and cable from rubbing on the holder.

By the foregoing construction, the bow holder may be simply set on the platform, with the channel receiving one of the rungs of the platform. The support arm may then be adjusted into an angular position comfortable for the hunter to support the bow in a desired ready position. The bowstring, cable and pulley may then be disposed in the groove on the support and the limb of the bow may be disposed in the cradle of the previously adjusted support arm. To remove the bow for use, the bow is simply lifted from the holder to clear the bowstring, cable and pulley from the slot of the support and the limb from the cradle.

In a preferred embodiment according to the present invention, there is provided a bow holder for a tree stand, comprising a frame having first and second opposite ends, with a support for the bow upstanding from the frame adjacent the first end and which support has a bifurcated portion defining a generally upwardly opening slot for receiving a portion of the bow. Means for securing the bow holder to the stand are provided and include a generally channel-shaped portion adjacent the first frame end and extending below the frame, the channel-shaped portion opening generally upwardly for receiving a portion of the stand. A support arm is also provided, together with means for pivotally connecting the support arm and the frame one to the other adjacent the second end of the frame. The support arm has a distal end remote from the pivotal connecting means for supporting a portion of the bow and means are carried by the frame for locking the arm in selected adjusted pivotal positions relative to the frame.

In a further preferred embodiment according to the present invention, there is provided a bow holder for a tree stand, comprising a frame having first and second opposite ends and a support for the bow upstanding from the frame adjacent the first end. The support has a bifurcated portion defining a generally upwardly opening slot for receiving a portion of the bow. Means are carried by the frame for securing the bow holder to the stand. A support arm is provided, together with means for pivotally connecting the support arm and the frame one to the other adjacent the second end of the frame. The support arm has a distal end remote from the pivotal connecting means for supporting a portion of the bow and means are provided for releasably locking the arm in selected adjusted pivotal positions relative to the frame.

According to a still further preferred embodiment of the present invention, the bow holder hereof may be provided in combination with a tree stand including the platform, the platform including a plurality of spaced-apart rungs. The frame extends over one of the rungs and the channel receives another of the rungs.

Accordingly, it is a primary object of the present invention to provide a novel and improved holder for use with a tree stand platform for holding a bow in a ready position and such bow holder in combination with a tree stand.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
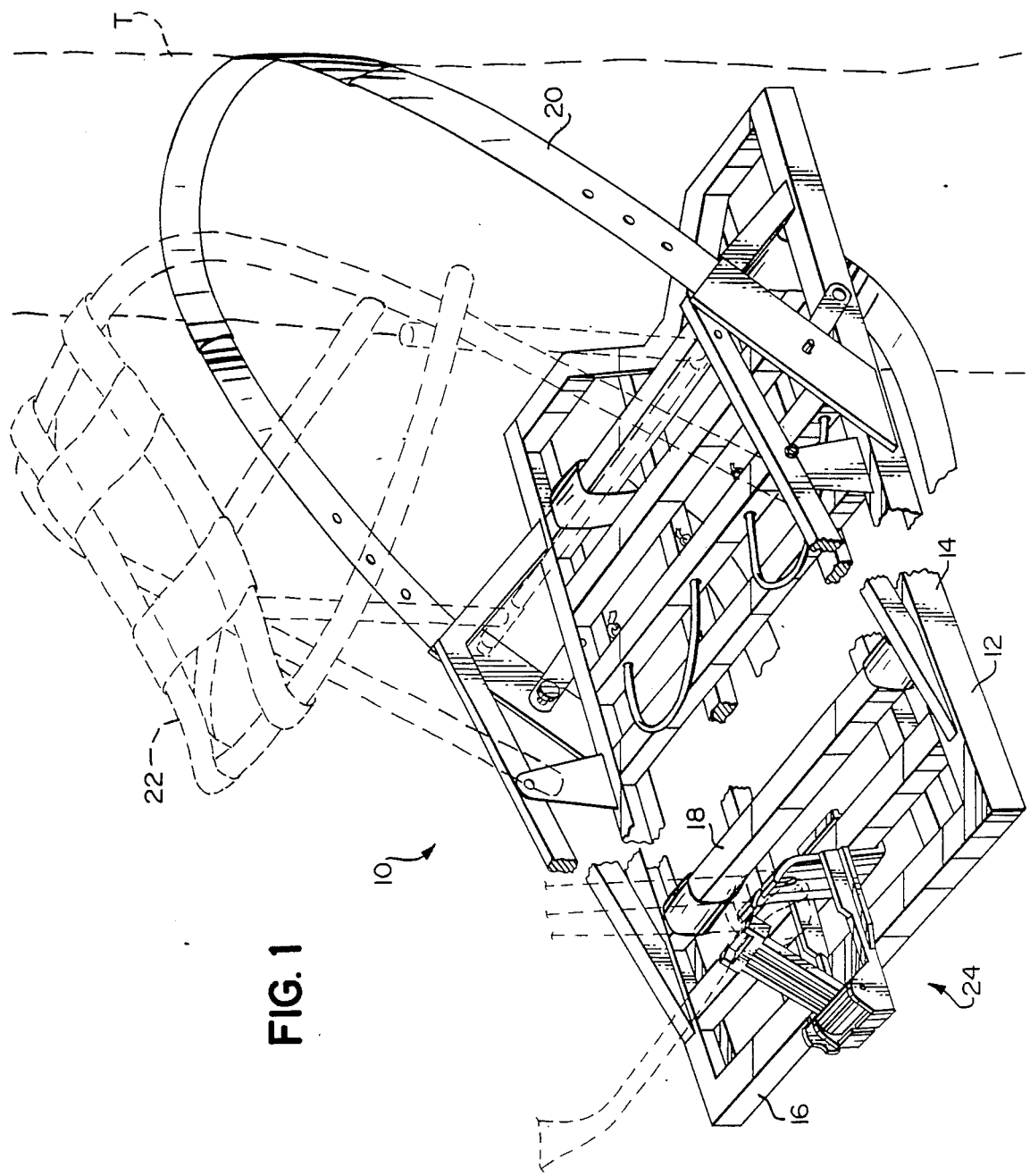
FIG. 1 is a perspective view with portions broken out and in cross-section of a tree stand mounted to a tree and illustrating a bow holder, constructed in accordance with the present invention, mounted on the tree stand platform.

Referring now to the drawings, particularly to FIG. 1, there is illustrated a tree stand, generally designated 10, constructed in accordance with the disclosure of my prior U.S. Pat. No. 4,802,552, of common assignee herewith, the disclosure of which patent is incorporated herein by reference. For purposes of the present description, it will be sufficient to note that the tree stand comprises a platform 12 having generally side and end rails 14 and 16, respectively, with a plurality of rungs 18 extending between side rails 14. As illustrated, each rung 18 is generally tubular, e.g., square in cross-section and formed of aluminum. Stand 10 also includes a climbing band 20, which extends about the tree T, for the purposes described in my prior U.S. Pat. No. 4,802,552. Stand 10 may also include a collapsible seat 22 illustrated by the dashed lines in the drawing figure. Details of the collapsible seat are disclosed in the aforementioned patent. The bow holder of the present invention, generally designated 24, is illustrated secured to stand 10 and details of bow holder 24 and the manner of its securement to the platform 12 of stand 10 will now be described.

Figure 2:
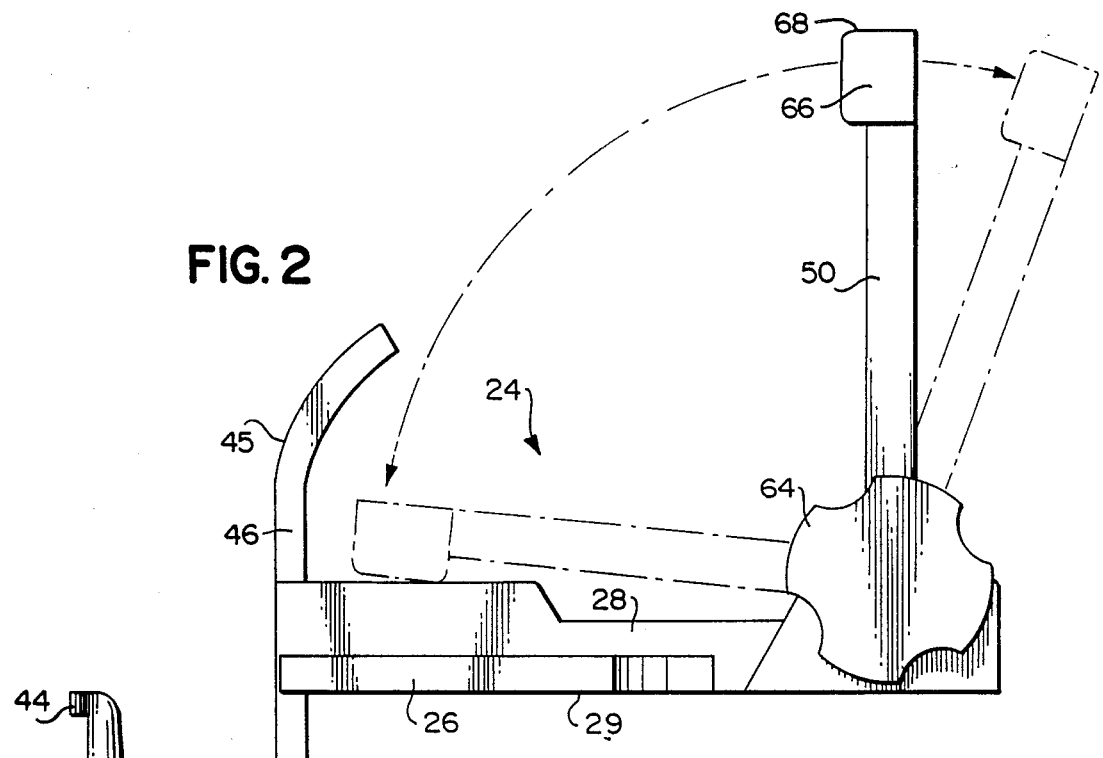
FIG. 2 is an enlarged side elevational view of the bow holder, according to the present invention.
Figure 5:
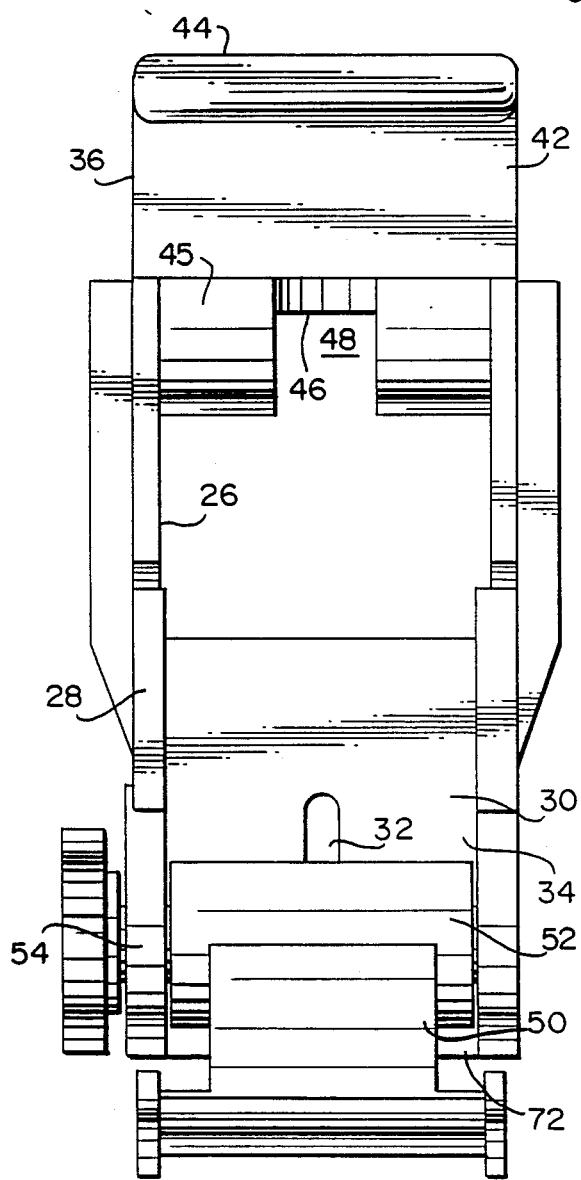
FIG. 5 is a top plan view of the bow holder hereof with the support arm illustrated in its extreme position.

Referring now to drawing FIGS. 2 and 5, bow holder 24 includes an elongated frame 26 having spaced opposite sides 28 connected one to the other by a flat plate 30, which is bifurcated at its forward end, as at 32 (FIG. 3) to provide a pair of plate parts 34, which may be displaced toward and away from one another for purposes which will become clear from the ensuing description. The plate 30 and the undersides of the sides 28 extend in a common plane whereby the underside 29 of frame 26 may rest on the upper face of the platform, as illustrated in FIG. 1.

Adjacent a first or rear end of frame 26, there is provided a depending channel 36. Channel 36 extends crosswise or laterally of frame 26 and includes first and second legs 38 and 40, spaced one from the other by a channel base 42. The legs 38 and 40 are spaced to correspond to the width of a rung of the platform whereby the channel may receive the rung when the bow holder is located on the platform. The distal end of leg 40 carries a lip 44 to facilitate removal of the bow holder from the platform, for example, by pushing down on the lip with the hunter's thumb, as explained hereinafter.

The first or rear end of bow holder 24 also includes an upstanding bow support 45. The bow support includes a continuation of leg 38 above frame 26 as at 46. The distal end of the support is bifurcated to provide a groove or slot 48 for receiving the bowstring, cable and pulley of the bow. The bifurcated legs of the support 46, as illustrated in FIG. 2, are curved forwardly and upwardly.

Figure 3:
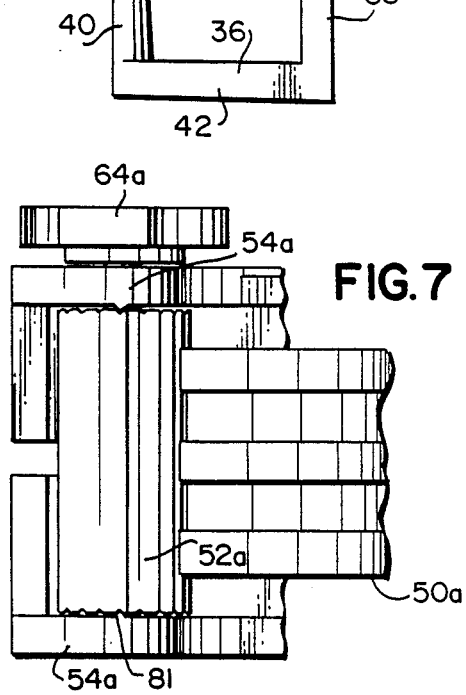
FIG. 3 is a fragmentary plan view illustrating the mounting of the hub of the bow support arm on the frame, with portions thereof broken out and in cross-section for ease of illustration.
Figure 4:
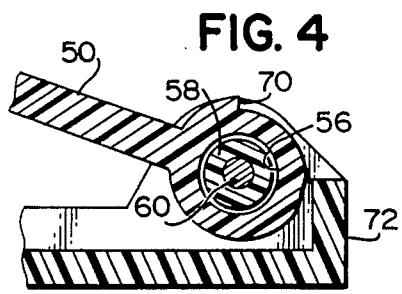
FIG. 4 is a cross-sectional view thereof taken generally about on line 4—4 in FIG. 3.

Adjacent the forward or second end of bow holder 24, there is provided a support arm 50. Support arm 50 includes a barrel or hub 52 disposed between a pair of upstanding bosses 54 on the opposite sides 28 of the frame 26. The hub 52, as illustrated in FIGS. 3 and 4, has a central aperture 56 for receiving a sleeve 58 and an axle 60. Axle 60 is screw-threaded at 62 at a distal end thereof in one of bosses 54. Sleeve 58 terminates in a handle or knob 64 laterally outwardly of the other boss 54. By rotating knob 64, axle 60 is threaded or unthreaded relative to one of bosses 54 to displace bosses 54 toward or away from one another, movement of which is permitted by bifurcated parts 34 of plate 30. Support arm 50 is therefore mounted for pivotal movement into selected adjusted angular positions by unthreading axle 60 and locked in a selected angular position by threading axle 60 to engage the hub 52 between bosses 54.

As best illustrated in FIG. 2, the distal end of the arm 50 terminates in a cradle 66. Cradle 66 includes a flat central part for receiving the limb of a bow and a pair of upstanding end projections 68 for maintaining the bow within the cradle. As illustrated in FIG. 2, the support arm 50 is pivotal between a predetermined range of angular movement, for example, as illustrated by the dashed lines at the extreme ends of such movement. The limit of movement in the counterclockwise direction, as illustrated in FIG. 2, is determined by the engagement of the cradle against the upper surface of the frame. The limit of movement of arm 50 in the clockwise direction illustrated in FIG. 2 is also determined by a stop. Particularly, the barrel or hub 52 is provided with a projecting lip 70 and the end of frame 26 is provided with an upstanding flange 72. It will be appreciated that upon pivotal movement of arm 50 toward and into the extreme dashed line position illustrated in FIG. 2, lip 70 engages the upper surface of flange 72 to provide a stop for the arm.

Figure 7:
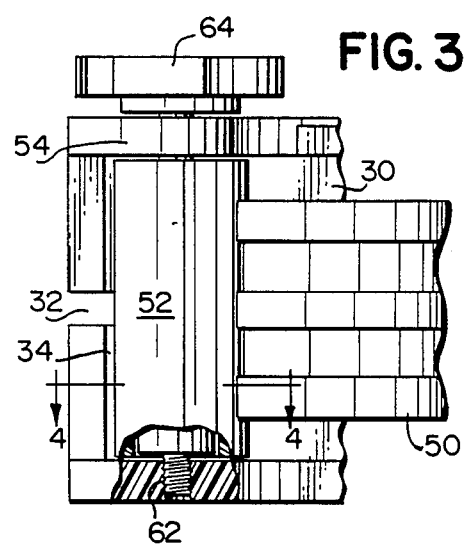
FIG. 7 is a view similar to FIG. 3 illustrating a further embodiment of the present invention.
Figure 8:
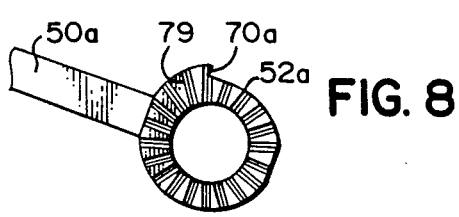
FIG. 8 is a fragmentary side view of the support arm illustrating the detenting projections carried thereby.

Referring now to the embodiment illustrated in FIGS. 7 and 8, the hub 52a is provided with a plurality of radially extending grooves 79 about each of its ends. A notch 81 is provided on bosses 54 for engagement in the grooves. Thus, notch 81 engages in a selected one of grooves 79, depending upon the angular position of support arm 50. The interior of the hub is similar as in the previous embodiment and, accordingly, rotating knob 64a to thread the axle into the boss 54a, will lock the hub in a selected angular position. Rotating knob 64a to unthread the axle will, of course, enable the arm to be rotated to another selected angular position.

The holder is formed of a durable, high-strength plastic material. In a preferred form, the material is a 10% glass-filled polycarbonate.

Figure 6:
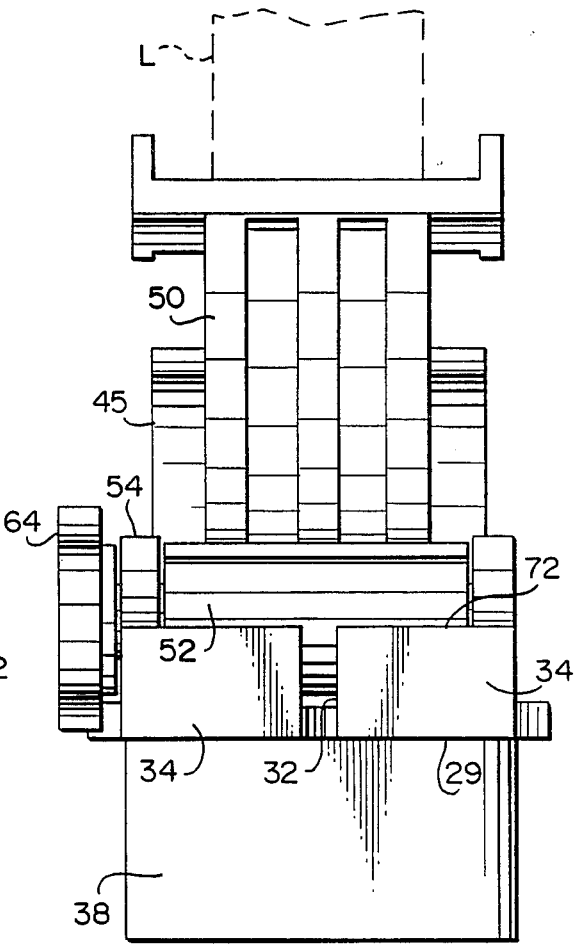
FIG. 6 is an end elevational view of the bow holder hereof looking from right to left in FIG. 2.

To use the bow holder hereof and referring now to FIG. 1, holder 24 may be disposed on platform 12 by inserting the channel between a pair of rungs and pivoting the holder to engage a rung within the channel. The underside 29 of frame 26 rests on the platform surface and holder 24 is thus secured to the platform. The bowstring, cable and pulley of the bow is then placed in the groove 48 of support 45 and the limb L (FIG. 6) of the bow is disposed against the cradle on the distal end of support arm 50. By adjusting the pivotal position of support arm 50, the bow can be selectively disposed forwardly or rearwardly into a ready position or a position comfortable to the particular hunter. With the bow thus positioned, the hunter need merely lift the bow from its supported position in the holder into the firing position.

It will thus be appreciated that the bow holder hereof enables the tree stand hunter to hunt hands-free, while the bow is maintained in a ready position. The bow holder also permits the hunter to adjust the angle of the bow to a convenient position and will accommodate various types of bows, for example, compound or recurved bows. The durable plastic from which the bow holder is made also enables the bow to be lifted from the holder without discernible noise. The adjustability of the bow holder in permitting the bow to be angled into the position desired by the hunter also minimizes the movement necessary to remove the bow from the holder and position it into firing position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bow holder for a tree stand, comprising:
   a frame having first and second opposite ends;
   a support for the blow upstanding from said frame adjacent said first end and having a bifurcated portion defining a generally upwardly opening slot for receiving a portion of the bow;
   means for securing the bow holder to the stand, including a generally channel-shaped portion adjacent said first frame end and extending below said frame, said channel-shaped portion opening generally upwardly for receiving a portion of the stand;
   a support arm;
   means for pivotally connecting said support arm and said frame one to the other adjacent said second end of said frame, said support arm having a distal end thereof remote from said pivotal connecting means for supporting a portion of the bow; and
   means carried by said frame for locking said arm in selected adjusted pivotal positions relative to said frame.

2. A bow holder according to claim 1 wherein said channel has a pair of legs and a base therebetween, one of said legs being connected to said frame, the distal end of the other of said legs carrying a projecting lip to facilitate removal of the bow holder from the platform.

3. A bow holder according to claim 1 wherein the bifurcated portion of said support extends forwardly toward said frame end to straddle the bow portion when the bow is disposed in the holder.

4. A bow holder according to claim 3 wherein said bifurcated portion curves forwardly toward said second frame end.

5. A bow holder according to claim 1 wherein said frame has a planar undersurface extending from said channel-shaped portion toward said second end for resting on the upper surface of the platform.

6. A bow holder according to claim 5 wherein said channel-shaped portion has a pair of legs and a base therebetween, one of said legs being connected to said frame, the distal end of the other of said legs carrying a projecting lip to facilitate removal of the bow holder from the platform, said one leg projecting downward from said planar undersurface.

7. A bow holder according to claim 1 wherein said support arm includes a cradle at its distal end for supporting the bow portion, said cradle including means defining a groove for receiving the limb of a bow.

8. A bow holder according to claim 1 wherein said locking means includes means for detenting said support arm in discrete selected angular positions relative to said frame.

9. A bow holder according to claim 1 wherein said support arm is pivoted through a predetermined range of angular movement, said locking means including means for securing said support arm at any angle within said range and releasing said support arm for pivotal movement.

10. A bow holder according to claim 1 wherein said support arm is pivoted through a predetermined range of angular movement, said locking means including means for securing said support arm at selected discrete and predetermined angles within said range and releasing said support arm for pivotal movement.

11. A bow holder according to claim 1 wherein said support arm is pivotal through a predetermined range of angular movement, and means cooperable between said frame and said support arm providing a stop for limiting the range of movement of said support arm in at least one pivotal direction.

12. A bow holder according to claim 11 wherein said frame includes a pair of bosses adjacent said second end thereof, an axle extending between said bosses and defining an axis, said support arm including a hub mounted on said axle for rotating about said axis, said hub carrying a projection for rotation therewith, said frame carrying an abutment whereby, upon pivotal movement of said support arm about said axis, said projection engages said abutment to provide an end stop for said support arm.

13. A bow holder according to claim 1 wherein said bow holder is formed of a plastic material.

14. A bow holder according to claim 1 in combination with a tree stand including said platform, said platform including a plurality of spaced-apart rungs, said frame extending over one of said rungs and said channel receiving another of said rungs.

15. A bow holder for a tree stand, comprising:
a frame having first and second opposite ends;
a support for the bow upstanding from said frame adjacent said first end and having a bifurcated portion defining a generally upwardly opening slot for receiving a portion of the bow;
means carried by said frame for securing the bow holder to the stand;
a support arm;
means for pivotally connecting said support arm and said frame one to the other adjacent said second end of said frame, said support arm having a distal end thereof remote from said pivotal connecting means for supporting a portion of the bow; and
means for releasably locking said arm in selected adjusted pivotal positions relative to said frame.

16. A bow holder according to claim 15 wherein the bifurcated portion of said support extends forwardly toward said frame end to straddle the bow portion when the bow is disposed in the holder.

17. A bow holder according to claim 15 wherein said support arm includes a cradle at its distal end for supporting the bow portion, the cradle including means defining a groove for receiving the limb of a bow.

18. A bow holder according to claim 15 wherein said pivotal connecting means includes means for detenting said support arm in discrete selected angular positions relative to said frame.

19. A bow holder according to claim 15 wherein said frame includes a pair of bosses adjacent said second end thereof, an axle extending between said bosses and defining an axis, said supporting arm including a hub mounted on said axle for rotating about said axis, said hub carrying a projection for rotation therewith, said frame carrying an abutment whereby, upon pivotal movement of said support arm about said axle, said projection engages said abutment to provide an end stop for said support arm.

20. A bow holder according to claim 15 in combination with a tree stand including a platform, said platform including a plurality of spaced-apart rungs, said frame extending over one of said rungs and said channel receiving another of said rungs, said bow holder being formed of a plastic material.

21. A bow holder according to claim 15 wherein said securing means includes a generally channel-shaped portion adjacent said first frame end and extending below said frame, said channel-shaped portion opening generally upwardly for receiving a portion of the stand, said channel having a pair of legs and a base therebetween, one of said legs being connected to said frame, the distal end of the other of said legs carrying a projecting lip to facilitate removal of the bow holder from the platform, the bifurcated portion of said support extending forwardly toward said frame end to straddle the bow portion when the bow is disposed in the holder, said bifurcated portion curving forwardly toward said second frame end, said frame having a planar undersurface extending from said channel-shaped portion toward said second end for resting on the upper surface of the platform, said locking means including means for detenting said support arm in discrete selected angular positions relative to said frame, and wherein said bow holder is formed of a plastic material.

22. A bow holder according to claim 21 in combination with a tree stand including said platform, said platform including a plurality of spaced-apart rungs, said frame extending over one of said rungs and said channel receiving another of said rungs.

* * * * *